United States Patent
Seo et al.

(10) Patent No.: US 10,333,180 B2
(45) Date of Patent: Jun. 25, 2019

(54) APPARATUS AND METHOD FOR ADJUSTING CHARGING CONDITION OF SECONDARY BATTERY

(71) Applicant: LG CHEM, LTD., Seoul (KR)

(72) Inventors: Se-Wook Seo, Daejeon (KR); Sang-Il Son, Daejeon (KR); Yo-Han Ko, Daejeon (KR); Jin-Hyung Lim, Daejeon (KR); Yong-Seok Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 188 days.

(21) Appl. No.: 15/549,838

(22) PCT Filed: Aug. 22, 2016

(86) PCT No.: PCT/KR2016/009267
§ 371 (c)(1),
(2) Date: Aug. 9, 2017

(87) PCT Pub. No.: WO2017/034275
PCT Pub. Date: Mar. 2, 2017

(65) Prior Publication Data
US 2018/0069272 A1 Mar. 8, 2018

(30) Foreign Application Priority Data
Aug. 21, 2015 (KR) .................. 10-2015-0118167

(51) Int. Cl.
*H02J 7/00* (2006.01)
*H01M 10/44* (2006.01)
(Continued)

(52) U.S. Cl.
CPC ........... *H01M 10/44* (2013.01); *B60L 3/0046* (2013.01); *B60L 58/12* (2019.02); *B60L 58/24* (2019.02);
(Continued)

(58) Field of Classification Search
CPC .......... H02J 7/0081; H02J 7/0086; H02J 7/04; H02J 7/041; B60L 58/24
(Continued)

(56) References Cited

U.S. PATENT DOCUMENTS 7,622,896 B2* 11/2009 Nakagawa ............... H02J 7/047
320/150
9,341,681 B2* 5/2016 Kobayakawa ...... H01M 10/486
(Continued)

FOREIGN PATENT DOCUMENTS

JP      2015-52462 A      3/2015
KR  10-2009-0086141 A    8/2009
(Continued)

OTHER PUBLICATIONS

International Search Report, issued in PCT/KR2016/009267 (PCT/ISA/210), dated Dec. 28. 2016.

*Primary Examiner* — Edward Tso
*Assistant Examiner* — Aaron Piggush
(74) *Attorney, Agent, or Firm* — Birch, Stewart, Kolasch & Birch, LLP

(57) ABSTRACT

An apparatus and method for adjusting a charging condition of a secondary battery are provided. The apparatus includes: a controller configured to receive measurement results from a current measuring unit and a temperature measuring unit of the secondary battery, determine a charging current value and a current temperature value, determine a predicted overheat amount required to raise the temperature of the secondary battery from the current temperature to a threshold temperature for a preset reference time by using a predefined thermodynamic calculation equation, determine a predicted charging current required to generate the predicted overheat amount through charging, determine a predicted charging voltage expected when the predicted charging current flows through an equivalent circuit of the
(Continued)

secondary battery, and when a condition of the predicted charging voltage being lower than a preset upper limit charging voltage is satisfied, adjust the upper limit charging voltage such that the upper limit charging voltage is lowered to the predicted charging voltage.

15 Claims, 4 Drawing Sheets

(51) Int. Cl.
    *H02J 7/04*     (2006.01)
    *B60L 3/00*     (2019.01)
    *B60L 58/12*     (2019.01)
    *B60L 58/24*     (2019.01)
    *H01M 10/42*     (2006.01)

(52) U.S. Cl.
    CPC .............. *H02J 7/00* (2013.01); *H02J 7/0008* (2013.01); *H02J 7/0081* (2013.01); *H02J 7/0086* (2013.01); *H02J 7/04* (2013.01); *H02J 7/041* (2013.01); *H02J 7/045* (2013.01); *H02J 7/047* (2013.01); *B60L 2240/54* (2013.01); *B60L 2240/545* (2013.01); *B60L 2260/56* (2013.01); *H01M 10/4221* (2013.01)

(58) Field of Classification Search
    USPC .................................. 320/148, 152, 159, 164
    See application file for complete search history.

(56) References Cited

U.S. PATENT DOCUMENTS

| | | |
|---|---|---|
| 2009/0195215 A1 | 8/2009 | Sato et al. |
| 2014/0002031 A1 | 1/2014 | Chaturvedi et al. |
| 2014/0084851 A1 | 3/2014 | Park et al. |
| 2015/0066837 A1 | 3/2015 | Twarog et al. |
| 2016/0131720 A1 | 5/2016 | Baba et al. |
| 2016/0254680 A1 | 9/2016 | Arai et al. |

FOREIGN PATENT DOCUMENTS

| | | |
|---|---|---|
| KR | 10-2013-0036729 A | 4/2013 |
| KR | 10-1398465 B1 | 5/2014 |
| WO | WO 2015/075857 A1 | 5/2015 |

* cited by examiner

APPARATUS AND METHOD FOR ADJUSTING CHARGING CONDITION OF SECONDARY BATTERY

TECHNICAL FIELD

The present disclosure relates to an apparatus and method for adjusting a charging condition such that a heat emission amount by charging is maintained at an appropriate level by predicting in advance a temperature rise of a secondary battery when charging the secondary battery.

The present application claims priority to Korean Patent Application No. 10-2015-0118167 filed on Aug. 21, 2015 in the Republic of Korea, the disclosure of which is incorporated herein by reference.

BACKGROUND ART

Secondary batteries generate electric energy through electrochemical oxidation and reduction reaction and are widely used for various purposes. The use range of the secondary batteries gradually expands. For example, the secondary batteries are used for apparatuses carried by a human hand such as mobile phones, lap-top computers, digital cameras, video cameras, tablet computers, and motor-driven tools, various electrically-driven power apparatuses such as electric bicycles, electric motorcycles, electric automobiles, hybrid automobiles, electric ships, and electric airplanes, electric power storage apparatuses used for storing power generated through new regeneration energy or surplus generated power, and uninterruptable power systems for stably supplying power to various kinds of information communication apparatuses including server computers and base stations for communication.

A charging method of a secondary battery varies depending on the purpose of application. Miniaturized secondary batteries used for hand-held terminals such as smartphones or mobile phones are charged by separate chargers. Also, large-scale secondary batteries used for electrically-driven power apparatuses are charged by power produced by the power apparatuses themselves. For example, large-scale secondary batteries mounted on electric automobiles or hybrid automobiles are charged by power produced by generators connected to engines or regeneration power produced when the automobiles reduce their speeds.

A secondary battery generates heat while it is charged. Most of heat generated during a charging process is Joule's heat generated by an internal resistance of the secondary battery. The heat may be emitted to the outside of the secondary battery through conduction or convection. However, when heat generated from the secondary battery is greater than heat emitted to the outside, heat is continuously accumulated inside the secondary battery and thus the temperature of the secondary battery rises continuously.

The life of the secondary battery is reduced when the temperature of the secondary battery excessively rises. Overheating of the secondary battery deteriorates properties of a kind of chemicals participating in an electrochemical reaction or causes physical transformation of a polymer material inside the battery vulnerable to heat. For example, when the secondary battery is overheated, a porous polymer separation layer between an anode and a cathode is softened and some of pores are closed, which may raise an internal resistance of the secondary battery. The rise of the internal resistance acts as a primary factor which reduces a charging capacity of the secondary battery.

Therefore, when the temperature of the secondary battery exceeds a threshold temperature set in advance, an appropriate management for lowering the temperature is required. The temperature of the secondary battery may be controlled through a cooling mechanism. For example, a water-cooled or air-cooled cooling device is coupled to the secondary battery, and when the temperature of the secondary battery is excessively raised, the temperature of the secondary battery may be reduced to an appropriate level by operating the coupled cooling device.

However, in the case where a space of a device or an apparatus on which the secondary battery is mounted is narrow, the cooling device cannot be coupled to the secondary battery. For example, when a secondary battery is mounted on a small electric automobile, a narrow space is provided for the installation of the secondary battery and a weight increase should be minimized by the mounting of the secondary battery. Thus, it is difficult to couple the secondary battery to the cooling device occupying a volume and weight of some degree.

For the secondary batteries used under the above circumstances, structural design technology for effectively emitting heat generated during a charging process through atmosphere by increasing the area of the secondary battery exposed to air is required.

However, there is a limit in reducing the temperature of the secondary battery to an appropriate level with only the structural design of the secondary battery. Even when heat generated from the secondary battery is emitted to the atmosphere, a circumstance which causes heat accumulation may occur.

Therefore, the inventor of the present disclosure has recognized that additional complementary technology of dynamically varying a charging condition such that the temperature of the secondary battery is maintained at an appropriate level during a process of charging the secondary battery is required.

DISCLOSURE

Technical Problem

The present disclosure is designed to solve the problems of the related art, and therefore the present disclosure is directed to providing an apparatus and method of maintaining the temperature of a secondary battery at an appropriate level regardless of a cooling mechanism coupled to the secondary battery by variably controlling a charging condition depending on the temperature of the secondary battery.

Technical Solution

In one aspect of the present disclosure, there is provided an apparatus for adjusting a charging condition of a secondary battery, the apparatus including: a current measuring unit configured to measure a charging current of the secondary battery; a temperature measuring unit configured to measure a current temperature of the secondary battery; and a controller coupled to the current measuring unit and the temperature measuring unit, wherein the controller is configured to receive measurement results from the current measuring unit and the temperature measuring unit to determine a charging current value and a current temperature value, determine a predicted charging current capable of generating, as Joule's heat through an internal resistance of the secondary battery, a heat amount required to raise the temperature of the secondary battery from the current temperature to a threshold temperature for a preset reference time, determine a predicted charging voltage expected when the predicted charging current flows through an equivalent circuit of the secondary battery, and when a condition of the predicted charging voltage being lower than a preset upper limit charging voltage is satisfied, adjust the upper limit charging voltage such that the upper limit charging voltage is lowered to the predicted charging voltage.

Preferably, the apparatus may further include: a switch device provided to a path through which the charging current of the secondary battery flows; and a voltage measuring unit configured to measure a charging voltage of the secondary battery, wherein the controller is coupled to the switch device and the voltage measuring unit.

Preferably, the controller may be configured to receive measurement results from the voltage measuring unit to determine a charging voltage value of the secondary battery, and when the charging voltage value corresponds to the predicted charging voltage, cut off the charging of the secondary battery by turning off the switch device.

The equivalent circuit may include serial resistor, at least one RC circuit, and an open circuit voltage source which varies a voltage thereof depending on a state of charge of the secondary battery, all of which are connected in series.

The controller may calculate the predicted charging voltage from Equation below.

$$V = OCV(z) + i^*R_0 + V_0^* \exp(-t/RC) + i^*R^*(1-\exp(-t/RC)).$$

(where i is a current flowing through the equivalent circuit of the secondary battery, $R_0$ is a resistance value of the serial resistor, R is a resistance value of a resistor included in the RC circuit, C is a capacitance value of a condenser included in the RC circuit, $V_0$ is an initial voltage value generated by the RC circuit, z is a state of charge of the secondary battery, and OCV(z) is an open circuit voltage corresponding to a state of charge).

The apparatus may further include a memory unit storing a state of charge-open circuit voltage lookup table, configured to lookup an open circuit voltage from a state of charge, wherein the controller may determine the state of charge of the secondary battery by periodically measuring a charging current or a discharging current of the secondary battery via the current measuring unit and adding up the measured current values using Coulomb counting method, and determine an open circuit voltage of the secondary battery by mapping the open circuit voltage corresponding to the determined state of charge from the state of charge-open circuit voltage lookup table.

According to one aspect of the invention, the apparatus may further include an external temperature measuring unit configured to measure an external temperature of the secondary battery, wherein the controller determines the external temperature value of the secondary battery by using the external temperature measuring unit, determines a predicted overheat amount $Q^*$ required to raise the temperature of the secondary battery from the current temperature to a preset threshold temperature for a preset time based on Equation below, calculates a current value capable of generating the predicted overheat amount $Q^*$ as Joule's heat via an internal resistance of the secondary battery, and determine the calculated current value as the predicted charging current.

$$Q^* = \{T^* - (T_c - T_{amb})\exp[-t/mC_pR_{th}] + T_{amb}\}/\{R_{th}(1-\exp[t^*/mC_pR_{th}])\}$$

(where $T^*$ is a preset threshold temperature, $t^*$ is a reference time, $T_c$ is a current temperature of the secondary battery measured by the temperature measuring unit, $T_{amb}$ is an external temperature of the secondary battery measured by the external temperature measuring unit, $R_{th}$ is a preset thermal resistance value between the secondary battery and outside, $C_p$ is a preset specific heat under constant pressure of the secondary battery, and m is weight of the secondary battery).

According to another aspect of the invention, the apparatus may further include an external temperature measuring unit configured to measure an external temperature of the secondary battery, wherein the controller determines the external temperature value of the secondary battery by using the external temperature measuring unit, and determines a current value corresponding to a solution approximately satisfying Equation below as the predicted charging current by applying a bisection algorithm to a current variable I of Equation below.

$$T^* = (T_c - T_{amb} - R_{th}I^2R)\exp\left(\frac{-t^*}{mC_pR_{th}}\right) + T_{amb} + R_{th}I^2R$$

(where $T^*$ is a preset threshold temperature, $t^*$ is a reference time, $T_c$ is a current temperature of the secondary battery measured by the temperature measuring unit, $T_{amb}$ is an external temperature of the secondary battery measured by the external temperature measuring unit, $R_{th}$ is a preset thermal resistance value between the secondary battery and outside, $C_p$ is a preset specific heat under constant pressure of the secondary battery, m is weight of the secondary battery, and R is an internal resistance of the secondary battery).

Preferably, when the predicted charging voltage is equal to or greater than the upper limit charging voltage, the controller may be configured to control the upper limit charging voltage such that the upper limit charging voltage maintains an initial set value.

Preferably, the controller may be configured to vary the reference time.

In another aspect of the present disclosure, there is also provided a method of adjusting a charging condition of a secondary battery, the method including: determining a charging current and a current temperature of the secondary battery; determining a predicted charging current capable of generating, as Joule's heat through an internal resistance of the secondary battery, a heat amount required to raise the temperature of the secondary battery from the current temperature to a threshold temperature for a preset reference time; determining a predicted charging voltage expected when the predicted charging current flows through an equivalent circuit of the secondary battery; and when a condition of the predicted charging voltage being lower than a preset upper limit charging voltage is satisfied, adjusting the upper limit charging voltage such that the upper limit charging voltage is lowered to the predicted charging voltage.

The above technical objects of the present disclosure may be accomplished by a computer-readable recording medium, on which the method of adjusting the charging condition of the secondary battery is programmed and recorded.

Also, the apparatus for adjusting the charging condition of the secondary battery may be included as a part of a secondary battery management system.

Also, the apparatus for adjusting the charging condition of the secondary battery may be mounted on various loads which are supplied with power by the secondary battery. The loads include various devices, apparatuses, and systems mentioned as applications of the secondary batteries in the related art.

Advantageous Effects

According to the present disclosure, the temperature of a secondary battery may be maintained at an appropriate level by varying a charging condition of the secondary battery with consideration of the temperature of the secondary battery. Particularly, even though a cooling mechanism is not coupled to the secondary battery, overheating of the secondary battery may be prevented. Also, the temperature of the secondary battery may be effectively controlled by changing a reference under which a charging condition varies depending on a heat transfer environment of the secondary battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
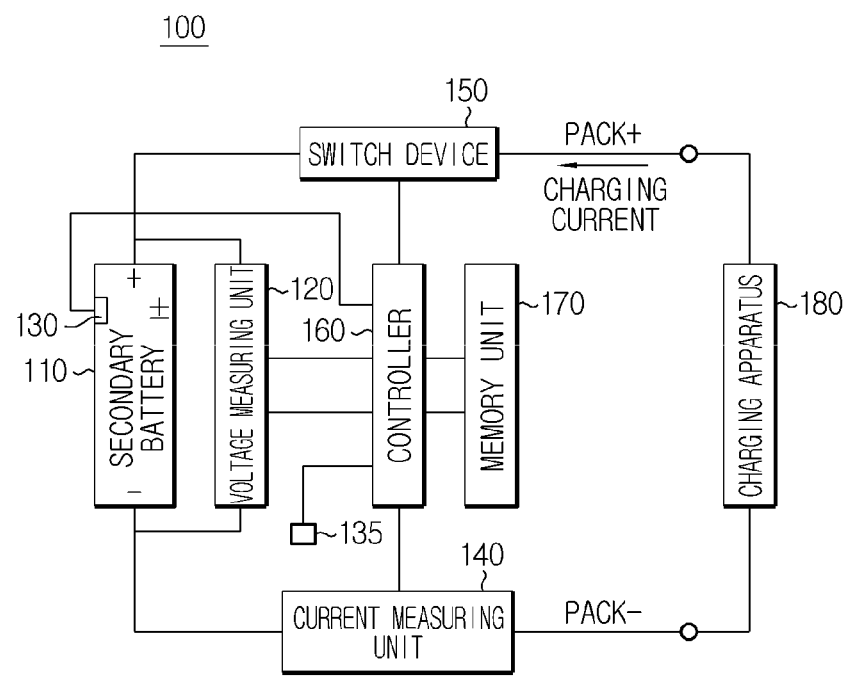
FIG. 1 is a block diagram schematically illustrating a configuration of an apparatus for adjusting a charging condition of a secondary battery according to an embodiment of the present disclosure.

FIG. 1 is a block diagram schematically illustrating a configuration of an apparatus for adjusting a charging condition of a secondary battery according to an embodiment of the present disclosure.

Referring to FIG. 1, the apparatus 100 for adjusting a charging condition of a secondary battery according to an embodiment of the present disclosure is a control apparatus coupled to a secondary battery 110 and capable of variably adjusting an upper limit charging voltage at which charging of the secondary battery 110 is suspended. The apparatus 100 for adjusting a charging condition of a secondary battery includes a voltage measuring unit 120, a temperature measuring unit 130, a current measuring unit 140, a switch device 150, a controller 160, and a memory unit 170.

The secondary battery 110 is a battery of a minimum unit for which a charging condition is adaptively adjusted and includes a plurality of unit cells electrically connected in series and/or in parallel. A case where the secondary battery 110 includes only one unit cell is also included in the scope of the present disclosure.

The unit cell is not limited to a specific kind as far as the unit cell is repeatedly charged and discharged. For example, the unit cell may be a pouch type lithium polymer secondary battery.

The secondary battery 110 is mounted on various load apparatuses. For example, the secondary battery 110 may be mounted on an electric automobile or a hybrid automobile.

In this case, the secondary battery 110 may include all or a portion of unit cells included in a modularized battery pack mounted on the automobile.

The secondary battery 110 may be selectively coupled to a charging apparatus 180. The charging apparatus 180 may be selectively coupled to the secondary battery 110 under control of the load apparatus mounting the secondary battery 110 thereon.

The charging apparatus 180 may be a charger exclusively used for charging. In another example, the charging apparatus 180 may be an apparatus producing charging power in a load apparatus mounting the secondary battery 110 thereon, for example, a generator coupled to an engine or a regeneration charging apparatus coupled to a brake of an automobile. The generator is coupled to a crankshaft of the engine and produces charging power when the crankshaft rotates. The regeneration charging apparatus produces regeneration charging power in cooperation with the brake when the automobile reduces its speed with manipulation of the brake. Since the generator and the regeneration charging apparatus are widely known in the field of an automobile, detailed descriptions thereof are omitted.

The voltage measuring unit 120, the temperature measuring unit 130, and the current measuring unit 140 periodically measure a voltage, a temperature, and a current of the secondary battery 110, respectively, with a time interval and provide measurement results to the controller 160. The measurement results may be provided to the controller 160 as analog signals or digital signals.

The voltage measuring unit 120 includes a voltage measuring circuit generally used in the field of a battery. For example, the voltage measuring circuit may include a differential amplification circuit configured to output a voltage signal corresponding to a voltage difference between an anode terminal and a cathode terminal of the secondary battery 110. The voltage measuring unit 120 generates the voltage signal corresponding to the voltage applied between the anode and the cathode of the secondary battery 110 and provides the same to the controller 160.

The temperature measuring unit 130 is a temperature sensor used for measuring temperature. For example, the temperature measuring unit 130 may be a thermo-coupler. The temperature measuring unit 130 generates a voltage signal corresponding to the temperature of the secondary battery 110 and provides the same to the controller 160.

The current measuring unit 140 is a sense resistor or a Hall sensor. The current measuring unit 140 generates a voltage signal corresponding to the magnitude of a charging current and provides the same to the controller 160. The current measuring unit 140 may measure not only the charging current but also a discharging current.

Meanwhile, the apparatus 100 for adjusting the charging condition may further include an external temperature measuring unit 135 configured to measure a temperature of the outside to which heat of the secondary battery 110 is emitted in addition to the temperature measuring unit 130 measuring the temperature of the secondary battery 110. The external temperature measuring unit 135 may include the same kind of the sensor as that of the temperature measuring unit 130, generate a voltage signal corresponding to an external temperature, and provide the same to the controller 160.

When measurement results are input from the respective measuring units 120, 130, 135, and 140, the controller 160 respectively determines a charging voltage value, a current temperature value, an external temperature value, and a charging current value of the secondary battery 110 through signal processing, and stores the same in the memory unit 170.

The memory unit 170 is a semiconductor memory device. The memory unit 170 records, erases, updates data generated by the controller 160, and stores a program required to adjust a charging condition of the secondary battery 110. Also, the memory unit 170 stores data for a state of charge-open circuit voltage lookup table by which an open circuit voltage OCV may be retrieved from a state of charge z of the secondary battery 110. Also, the memory unit 170 stores preset values of various parameters used for implementing the present disclosure.

The memory unit 170 is not particularly limited to a specific kind as far as the memory unit is a semiconductor memory device known to record, erase, and update data. For example, the memory unit 170 may be DRAM, SDRAM, a flash memory, ROM, EEPROM, a register, etc. The memory unit 170 may be physically separated from the controller 160 or may be integrated into one body together with the controller 160.

The switch device 150 is a kind of a switch provided to a path through which a charging current flows. For example, the switch device 150 may be a relay device including a contact point which operates with an electromagnet. In this case, the switch device 150 includes a driver circuit for driving the electromagnet. The switch device 150 is turned on or turned off by receiving a control signal from the controller 160.

The controller 160 may variably control a charging condition of the secondary battery 110 such that the temperature of the secondary battery 110 is maintained at an appropriate level while the charging of the secondary battery 110 is in progress.

The controller 160 may selectively include a processor, an application-specific integrated circuit (ASIC), a different chipset, a logic circuit, a register, a communication modem, a data processing unit, etc. in order to execute control logics described below.

Also, in the case where the control logics are implemented as software, the controller 160 may be implemented as a set of program modules. In this case, each program module may be stored in a memory and executed by a computer processor. The memory may be provided inside or outside the processor and may be connected to the processor as well-known various computer parts. Also, the memory may be included in the memory unit 170 of the present disclosure. Also, the memory collectively denotes a device configured to store information regardless of a kind of the device and does not denote a specific memory device.

One or more various control logics of the controller 160 are combined and the combined control logics may be written in a computer-readable code system and recorded on a computer-readable recording medium. The recording medium is not particularly limited to a specific kind as far as the recording medium is accessible by a processor included in a computer. For example, the recording medium includes at least one of ROM, RAM, a register, CD-ROM, a magnetic tape, a hard disk, a floppy disk, and an optical data recording apparatus. Also, the code system may be modulated into carrier signals and included in a communication carrier at a specific point of time. Further, the code system may be distributed over computers connected via a network, and stored and executed by the computers. Also, functional programs, codes, and code segments for implementing the combined control logics may be easily inferred by programmers of the technical field to which the present disclosure pertains.

The controller 160 may be a battery management system (BMS) that may be electrically coupled to the secondary battery 110 or may be a control element included in the BMS.

Though the BMS may mean a system called a BMS in the technical field to which the present disclosure pertains, any system may be included in the scope of the BMS as far as the system performs at least one of functions described in the present disclosure in a functional aspect.

Figure 2:
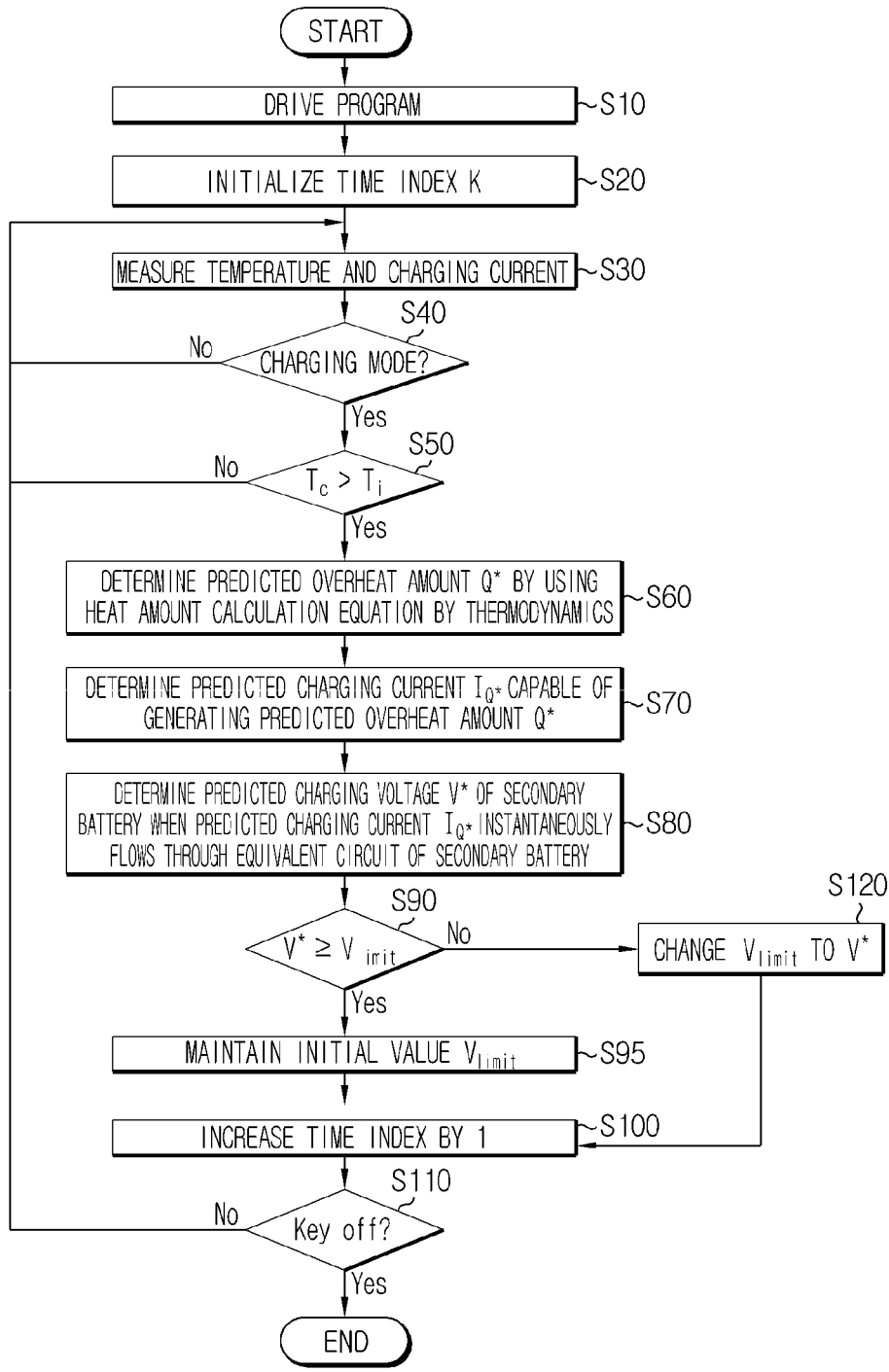
FIG. 2 is a flowchart specifically illustrating a flow of a method of adjusting a charging condition of a secondary battery according to an embodiment of the present disclosure.

FIG. 2 is a flowchart specifically illustrating a flow of control logics including a method of adjusting a charging condition of a secondary battery executed by the controller 160.

Hereinafter, a method of adjusting a charging condition of a secondary battery according to the present disclosure is specifically described with reference to FIG. 2.

First, in operation step S10, the controller 160 executes a program stored in the memory unit 170. The program includes operation steps including the method of adjusting the charging condition of the secondary battery according to the present disclosure, and related program codes. After operation step S10, operation step S20 is executed.

In operation step S20, the controller 160 initializes a time index k. That is, the controller 160 gives 1 to the time index k. Here, the time index k is a variable representing an iteration sequence of an algorithm shown in FIG. 2. For example, when the time index k is 3, it means that the algorithm iterates third times. After operation step S20, operation step S30 is executed.

In operation step S30, the controller 160 determines a current temperature value and a charging current value of the secondary battery 110 by using the temperature measuring unit 130 and the current measuring unit 140. In this case, the temperature measuring unit 130 and the current measuring unit 140 measure the current temperature and the magnitude of the charging current of the secondary battery 110 under control of the controller 160, and provide a temperature measurement result and a current measurement result to the controller 160 in the form of analog signals or digital signals. Then, the controller 160 determines the current temperature value and the charging current value of the secondary battery 110 through a signal processing procedure, for example, A/D converting, and stores the determined values in the memory unit 170. After operation step S30 is executed, operation step S40 is executed.

In operation step S40, the controller 160 determines whether a charging mode is in progress with reference to a charging current value stored in the memory unit 170. That is, when the charging current value is not 0, the controller 160 determines that the charging mode is in progress. On the contrary, when the charging current value is 0, the controller 160 determines that the charging of the secondary battery 110 is not in progress.

When the determination result of operation step S40 is NO, the controller 160 returns to operation step S30 again. When the determination result of operation S40 is YES, the controller 160 performs operation step S50.

In operation step S50, the controller 160 reads a current temperature value $T_c$ of the secondary battery 110 stored in the memory unit 170, and then determines whether the current temperature value $T_c$ of the secondary battery 110 is greater than a minimum value $T_i$ of a temperature range which requires adjustment of a charging condition.

When the determination result of operation step S50 is NO, the controller 160 returns to operation step S30 again. When the determination result of operation step S50 is YES, the controller 160 performs operation step S60.

In operation step S60, the controller 160 determines a predicted overheat amount Q* required to raise the current temperature $T_c$ of the secondary battery 110 to a threshold temperature T* within a preset reference time t* by using a heat amount calculation equation according to a thermodynamic theory.

Here, the threshold temperature T* denotes a temperature at which the secondary battery 110 may be considered as being overheated, and may be preset according to specification of the secondary battery 110.

In an embodiment, the heat amount calculation equation is defined by Equation 1 below.

$$Q^* = \{T^* - (T_c - T_{amb})\exp[-t^*/mC_pR_{th}] + T_{amb}\} / \{R_{th}(1 - \exp[-t^*/mC_pR_{th}])\} \quad \langle\text{Equation 1}\rangle$$

Equation 1 has been derived through a process below.

According to a thermodynamic theory, in the secondary battery 110 in which a specific heat under constant pressure is $C_p$, temperature is $T_c$, and weight is m, when heat amount Q is generated and the heat is conducted to the neighborhood, a temperature change dT of the secondary battery 110 with respect to a time change dt meets a differential equation described by Equation 2 below.

$$mC_p \frac{dT}{dt} = \frac{T_c - T_{amb}}{-R_{th}} + Q \quad \langle\text{Equation 2}\rangle$$

(where $T_c$ is a current temperature of the secondary battery; $T_{amb}$ is a temperature of the neighborhood contacting the secondary battery; $R_{th}$ is a thermal resistance between the secondary battery and the neighborhood thereof, and is a value measured in advance through experiment; $C_p$ is specific heat under constant pressure of the secondary battery, and is a value measured in advance by experiment; and m is mass of the secondary battery).

Next, when Equation 2 is integrated with respect to time, Equation 3 below may be obtained, Equation 3 being a temperature change equation representing a temperature value of the secondary battery 110 when an arbitrary time t elapses from a reference time at which heat amount Q is generated from the secondary battery 110.

$$T(t) = C_0 \exp\left(\frac{-t}{mC_pR_{th}}\right) + T_{amb} + R_{th}Q \quad \langle\text{Equation 3}\rangle$$

where $C_0 = T_c - T_{amb} - R_{th}Q$

Next, after respectively inputting a preset reference time t* and a threshold temperature T* into a time variable t and a temperature variable T in Equation 3, when arranging for Q, Equation 1 may be obtained, Equation 1 representing a predicted overheat amount Q* required to raise the current temperature $T_c$ of the secondary battery 110 to the threshold temperature T* within the preset reference time t*.

Meanwhile, the controller 160 should use an external temperature value when determining the predicted overheat amount Q*. Therefore, the controller 160 may measure an external temperature of the secondary battery 110 by using the external temperature measuring unit 135 and store the same in the memory unit 170 in operation step S30, and may refer to the external temperature when determining the predicted overheat amount Q*.

After determining the predicted overheat amount Q* in operation step S60, the controller 160 performs operation step S70.

In operation step S70, the controller 160 determines the magnitude of a predicted charging current $I_Q^*$ required to generate the predicted overheat amount Q* determined in operation step S60 by using Equation 4 below representing a relation between a heat amount and a current.

$$Q = I^2 * R \quad \langle\text{Equation 4}\rangle$$

where Q is a heat emission amount of the secondary battery, I is the magnitude of a charging current, and R is an internal resistance value of the secondary battery.

That is, when inputting a predicted overheat amount Q* and an internal resistance value of the secondary battery set in advance by experiment into variables Q and R of Equation 4, a value of the predicted charging current $I_Q^*$ which may generate the predicted overheat amount Q* required to raise the current temperature $T_c$ of the secondary battery 110 to the threshold temperature T* for the reference time t* may be determined. After operation step S70, the controller 160 performs operation step S80.

In operation step S80, the controller 160 determines a predicted charging voltage V* generated between an anode and a cathode of the secondary battery 110 when the predicted charging current $I_Q^*$ determined in operation step S70 instantaneously flows through an equivalent circuit of the secondary battery 110. Here, time for which the predicted charging current $I_Q^*$ flows may be determined in advance in the range of several seconds. Preferably, time for which the predicted charging current $I_Q^*$ flows may be set in advance as a time value (for example, 1 second) corresponding to a period by which the algorithm exemplified in FIG. 2 iterates.

Figure 3:
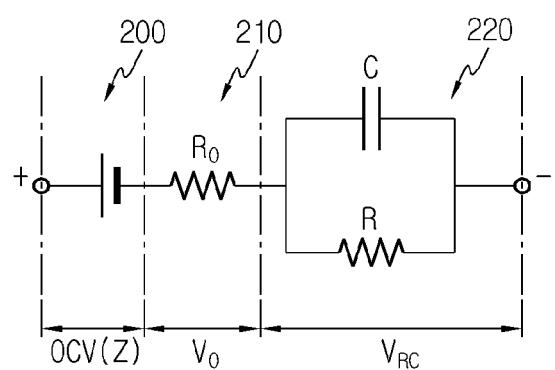
FIG. 3 is a circuit diagram illustrating an equivalent circuit of a secondary battery according to an embodiment of the present disclosure.

In an embodiment, as illustrated in FIG. 3, the equivalent circuit includes an open circuit voltage source 200 which varies a voltage thereof depending on a state of charge z of the secondary battery 110, a serial resistor 210 representing an internal resistance $R_0$ of the secondary battery 110, and at least one RC circuit 220 modeling a polarization characteristic of the secondary battery 110. However, the present disclosure is not limited to kinds of circuit elements included in the equivalent circuit of the secondary battery 110 and a connection relation therebetween.

In an embodiment, the predicted charging voltage V* may be determined by a voltage calculation equation of Equation 5 below derived from the equivalent circuit.

$$V=OCV(z)+i*R_0+V_0* \exp(-t/RC)+i*R*(1-\exp(-t/RC)). \qquad 5$$

In Equation 5, OCV(z) represents an open circuit voltage corresponding to a state of charge z of the secondary battery 110. The open circuit voltage value may be determined with reference to a state of charge-open circuit voltage lookup table stored in advance in the memory unit 170. The state of charge-open circuit voltage lookup table may be predefined by a charging experiment of the secondary battery 110.

The controller 160 may determine a state of charge z of the secondary battery 110 by periodically measuring a charging current or a discharging current of the secondary battery 110 using the current measuring unit 140, adding up measured current values, and determining a relative ratio between the added current amount and a fully charged capacity of the secondary battery 110. The procedure of determining the state of charge z may be performed independently of the algorithm shown in FIG. 2. However, integrating of the calculation algorithm for the state of charge z into the algorithm shown in FIG. 2 is not limited. Since the method of calculating a state of charge of the secondary battery 110 by adding up of the current is widely known as a title of Coulomb counting method, more detailed description thereof is omitted.

In Equation 5, "$i*R_0$" represents the magnitude of a voltage applied between both ends of the serial resistor 210 when a current i flows through the equivalent circuit of the secondary battery 110. $R_0$ is a resistance value of the serial resistor 210 and may be set in advance by experiment.

"$V_0*\exp(-t/RC)+i*R*(1-\exp(-t/RC))$" of Equation 5 represents the magnitude of a voltage applied to the RC circuit 220 when a current i flows through the RC circuit 220. A voltage applied between both ends of the RC circuit 220 changes depending on time.

In an embodiment, when determining the predicted charging voltage V* in operation step S80, a preset time value of less than several seconds may be input to a variable t. Preferably, a time value (for example, 1 second) corresponding to a period by which the algorithm exemplified in FIG. 2 iterates may be input to the variable t. Also, the value of the predicted charging current $I_Q$* determined in operation step S70 may be allocated to the variable i.

In Equation 5, R and C are a resistance value and a capacitance value of a resistor and a condenser included in the RC circuit 220. R and C are parameters set in advance by experiment.

In Equation 5, $V_0$ is an initial voltage applied to the RC circuit 220 before the current i flows through the RC circuit 220. An initial value of $V_0$ is set to 0. Also, whenever the calculation algorithm of FIG. 2 periodically iterates, a voltage value of the RC circuit calculated in a previous calculation cycle may be allocated to $V_0$ as an updated value.

After the predicted charging voltage V* is determined in operation step S80, operation step S90 is performed as a subsequent operation.

In operation step S90, the controller 160 determines whether the predicted charging voltage V* is equal to or greater than an upper limit charging voltage $V_{limit}$ of the secondary battery 110. The upper limit charging voltage $V_{limit}$ is a boundary voltage value at which the secondary battery 10 enters an overcharged state and may be set in advance depending on specification of the secondary battery 110.

When the determination result in operation step S90 is YES, the controller 160 maintains an original value of the upper limit charging voltage $V_{limit}$ in operation step S95. After that, the controller 160 increases a time index k by 1 in operation step S100 and then determines whether the secondary battery 110 is in a key-off state in operation step S110.

Here, the key-off state denotes that the secondary battery 110 is in a no-load state, that is, in a state in which charging or discharging is substantially suspended.

The controller 160 may measure the magnitude of a charging or discharging current of the secondary battery 110 through the current measuring unit 140 in operation step S110, and when the measured magnitude of the current is substantially 0, the controller 160 may determine that the secondary battery 110 is in the key-off state.

When the determination result in operation step S110 is NO, that is, when the state of the secondary battery 110 is not in the no-load state, the controller 160 puts back the process to operation step S30 in order to iterate the algorithm shown in FIG. 2 again based on the increased time index. After that, the above-described operations iterate again. On the contrary, when the determination result in operation step S110 is YES, that is, when the secondary battery 110 is in the no-load state, the controller 160 ends the algorithm shown in FIG. 2.

Meanwhile, when the determination result in operation step S90 is NO, that is, when the predicted charging voltage V* is less than the initial set value of the upper limit charging voltage $V_{limit}$, the controller 160 changes the upper limit charging voltage $V_{limit}$ of the secondary battery 110 into the predicted charging voltage V* (determined in operation step S80) in operation step S120. After that, the controller 160 increases the time index k by 1 in operation step S100 and determines whether the secondary battery 110 is in the key-off state in operation step S110. When the determination result in operation step S110 is NO, that is, when the state of the secondary battery 110 is not in the no-load state, the controller 160 puts back the process to operation step S30 in order to iterate the algorithm shown in FIG. 2 again based on the increased time index. After that, the above-described operations iterate again.

In the present disclosure, the controller 160 may perform a control of cutting off charging of the secondary battery 110 when a charging voltage of the secondary battery 110 reaches the upper limit charging voltage $V_{limit}$ independently of the control algorithm shown in FIG. 2.

That is, the controller 160 may determine a charging voltage value of the secondary battery 110 by using the voltage measuring unit 120 with a predetermined time interval and store the same in the memory unit 170. Also, when a charging voltage value determined at a current point of time reaches the upper limit charging voltage $V_{limit}$, the controller 160 cuts off charging of the secondary battery by outputting a control signal to the switch device 150 and thus turning off the switch device 150. When the charging is cut off, since heat emission by the charging of the secondary battery 110 is suspended, an increase of the temperature of the secondary battery 110 may be prevented.

When the predicted charging voltage V* determined in operation step S80 is less than the upper limit charging voltage $V_{limit}$ set in advance according to the specification of the secondary battery 110, the upper limit charging voltage $V_{limit}$ is changed into the predicted charging voltage V* in operation step S120. That is, the upper limit charging voltage $V_{limit}$ becomes lower than the originally set initial value. Therefore, the controller 160 cuts off charging of the secondary battery 110 at a voltage lower than a voltage of a general case. Generally, this case denotes a case where a heat emission amount is generated much by charging of the secondary battery 110 and there is a possibility that the temperature of the secondary battery 110 enters an overheat section when the charging is continuously performed.

Meanwhile, when the temperature of the secondary battery 110 is lowered to an appropriate level again, since a charging current value $I_Q^*$ determined in operation step S70 increases, the predicted charging voltage V* gradually approaches the original upper limit charging voltage $V_{limit}$ again. Therefore, a voltage at which the charging of the secondary battery 110 is cut off converges into the original upper limit charging voltage $V_{limit}$. Also, when the temperature of the secondary battery 110 is stabilized even more, the predicted charging voltage V* determined in operation step S80 increases beyond the initial value of the upper limit charging voltage $V_{limit}$. From this point, the charging of the secondary battery 110 is cut off again at the upper limit charging voltage $V_{limit}$ set as the initial value.

When the algorithm shown in FIG. 2 periodically iterates, in the case where there is a possibility that the temperature of the secondary battery 110 excessively rises, the charging cut-off of the secondary battery 110 is performed at a voltage condition lower than the initially set upper limit charging voltage $V_{limit}$. Therefore, overheating of the secondary battery 110 may be effectively prevented regardless of whether a cooling mechanism is coupled to the secondary battery 110.

Meanwhile, in the present disclosure, it is readily possible to determine the predicted charging current $I_Q^*$ by applying a bisection algorithm to a current variable I included in the temperature change equation of Equation 3.

That is, by inputting the preset reference time t* and the threshold temperature T* into the temperature change equation of Equation 3 and changing a current value, the controller 160 may approximately find a current value meeting Equation 6 below and determine the found value as the predicted charging current $I_Q^*$.

For reference, Equation 6 below is obtained by inputting $I^2R$ to Q of Equation 3. Equation 6 below is a function of a current I.

$$T^* = C_0 \exp\left(\frac{-t^*}{mC_pR_{th}}\right) + T_{amb} + R_{th}Q \qquad \langle \text{Equation 6} \rangle$$

$$= (T_c - T_{amb} - R_{th}I^2R)\exp\left(\frac{-t^*}{mC_pR_{th}}\right) +$$

$$T_{amb} + R_{th}I^2R$$

A procedure of determining a value of the predicted charging current $I_Q^*$ by applying a bisection algorithm to Equation 6 is described below.

First, the controller 160 sets a charging current value $I_k$ measured at a current time index k and a current value $I_{k+}$ sufficiently greater than the current value $I_k$ as a boundary condition of the bisection algorithm.

In the boundary condition, $I_k$ is a minimum value, and $I_{k+}$ is an upper limit value. The controller 160 may determine $I_{k+}$ such that at least Equation 7 below is satisfied.

$[F(I_{lower})-T^*][F(I_{upper})-T^*]<0$ <Equation 7>

In Equation 7, a function F represents Equation 6, $I_{lower}$ input to an input variable of the function is the minimum value of the boundary condition, and $I_{upper}$ input to an input variable of the function is the upper limit value of the boundary condition. When Equation 7 is satisfied, it means that a current value corresponding to a solution satisfying Equation 6, that is, the predicted charging current value $I_Q^*$ is included within the boundary condition.

Subsequently, the controller 160 sets again boundary conditions at the left and the right based on $I_{k\_median}$, which is an average value of the boundary condition. That is, the controller 160 respectively sets new boundary conditions between $I_k$ and $I_{k\_median}$, and between $I_{k\_median}$ and $I_{k+}$.

After that, the controller 160 identifies which boundary condition satisfies Equation 7 among the boundary condition between $I_k$ and $I_{k\_median}$, and the boundary condition between $I_{k\_median}$ and $I_{k+}$.

If the boundary condition between $I_k$ and $I_{k\_median}$ satisfies Equation 7, it means that a solution is included between $I_k$ and $I_{k\_median}$, and if the boundary condition between $I_{k\_median}$ and $I_{k+}$ satisfies Equation 7, it means that a solution is included between $I_{k\_median}$ and $I_{k+}$.

When a new boundary condition of a current in which a solution exists is identified, the controller 160 divides the boundary condition into two boundary conditions again based on an average value of an upper limit value and a minimum value of the identified boundary condition, and determines which boundary condition satisfies Equation 7 among the two boundary conditions again.

Whenever a boundary condition including a solution is determined as described above, the controller 160 reduces a width of the boundary condition including a solution to less than a threshold value (for example, 0.001 Ampere) by iterating a process of dividing the boundary condition into two boundary conditions based on an average value of the boundary conditions again, and determining a boundary condition including a solution again.

After that, the controller 160 may determine an average value of an upper limit value and a minimum value of the boundary condition which has narrowed to a width of less than the threshold value as a current value corresponding to a solution approximately satisfying Equation 6, that is, the predicted charging current $I_Q^*$.

In the case where the present disclosure employs an alternative example described above, in the algorithm shown in FIG. 2, operation step S60 may be omitted, operation step S70 may be replaced with operation step of determining a value of the predicted charging current IQ* by using a bisection algorithm, and the rest of operation steps may be equally maintained substantially.

Hereinafter, effects of the present disclosure are described through an experiment example. Since the experiment example described in the present specification is intended for assisting understanding of the present disclosure, it is obvious that the scope of the present disclosure is not limited to the experiment example.

First, a pouch type lithium polymer secondary battery has been mounted on a charging-discharging simulator, the secondary battery having an operation voltage range from 2.1V to 2.47V, and having capacity of 10 Ah. Also, an upper limit charging voltage $V_{limit}$ has been adjusted by applying the present disclosure based on a predicted charging voltage V* while pulse-charging/discharging the secondary battery according to a driving profile which simulates a downtown driving circumstance of an automobile, particularly while charging is in progress. A charging/discharging experiment has been simulated such that the charging of the secondary battery is performed by regeneration charging power generated when an electric automobile reduces its speed. While the charging/discharging experiment is in progress, even when a charging current is applied from a charging/discharging simulator to the secondary battery, when a charging voltage of the secondary battery reaches an upper limit charging voltage $V_{limit}$, the charging has been immediately cut off by turning off a switch connected between the charging/discharging simulator and the secondary battery. For this purpose, a controller configured to control an operation of the switch has been connected to the switch. Also, the charging/discharging experiment has been independently performed for each reference time t*, which is one of parameters used for the present disclosure, under the same downtown driving pattern by differently setting values of the reference time t* to 300 seconds, 600 seconds, and 1200 seconds, respectively.

Figure 4:
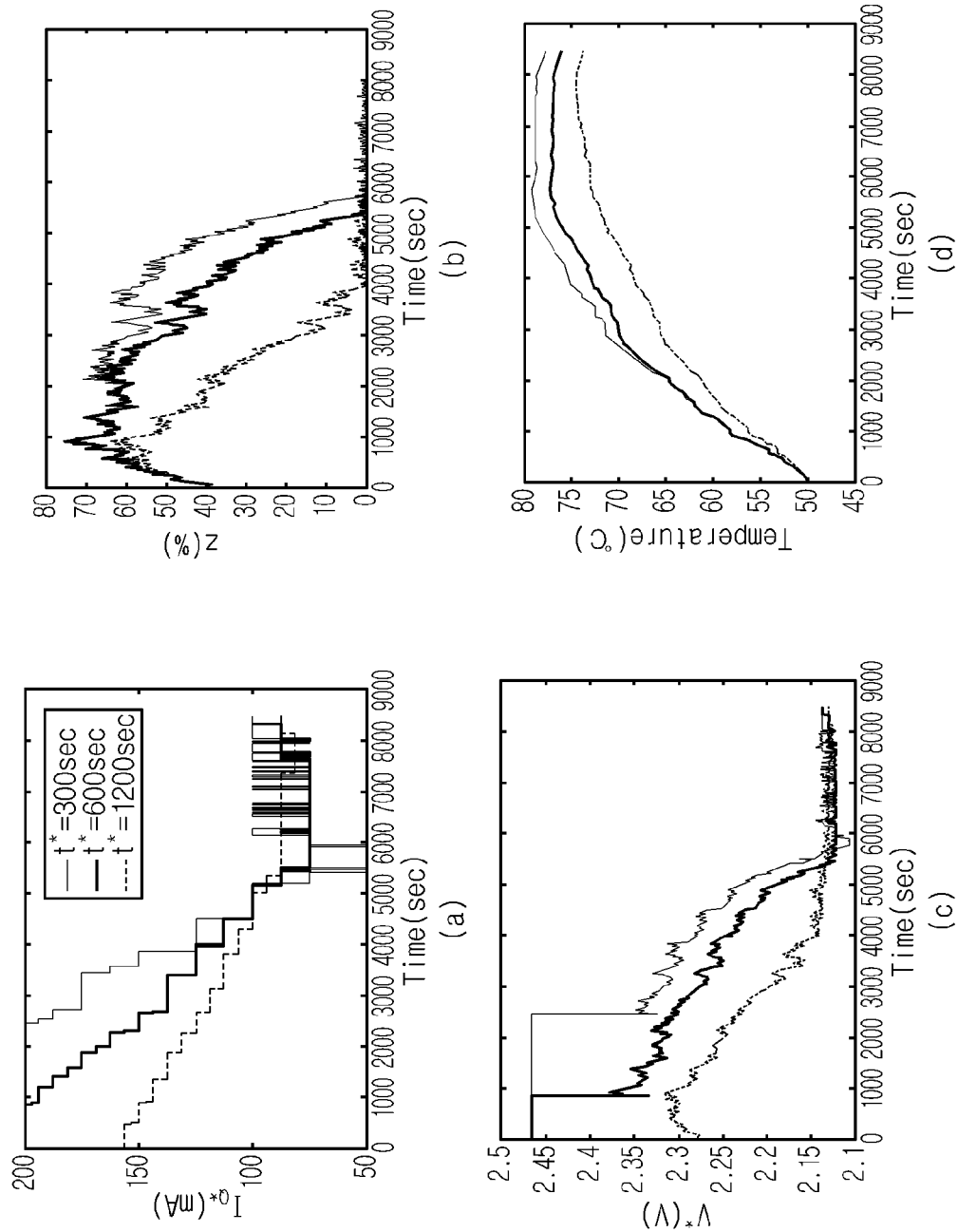
FIG. 4 illustrates graphs measured through an exemplary experiment carried out according to an embodiment of the present disclosure, in which a graph (a) illustrates a change in a predicted charging current, a graph (b) illustrates a change in a state of charge, a graph (c) illustrates a change in a predicted charging voltage, and a graph (d) illustrates a change in the temperature of a secondary battery.

FIG. 4 is graphs illustrating a change (graph (a)) of a predicted charging current $I_Q^*$, a change (graph (b)) in a state of charge of a secondary battery, a change (graph (c)) in a predicted charging voltage V*, and a temperature change (graph (d)) of a secondary battery, each obtained through the present experiment.

In FIG. 4, a thin solid line graph represents a case where a reference time t* has been set to 300 seconds, a thick solid line graph represents a case where a reference time t* has been set to 600 seconds, and a dotted line graph represents a case where a reference time t* has been set to 1200 seconds.

Referring to FIG. 4, it is revealed that as the temperature of the secondary battery increases depending on time, a predicted charging current $I_Q^*$ and a predicted charging voltage V* are correspondingly reduced. This is because when the temperature of the secondary battery rises, a predicted overheat amount Q* is reduced and thus the predicted charging current $I_Q^*$ is also reduced, and the predicted charging voltage V* calculated from the predicted charging current $I_Q^*$ by using an equivalent circuit of the secondary battery is also reduced.

In the present experiment, an upper limit charging voltage has been set to 2.47V. Therefore, when the predicted charging voltage V* is lower than 2.47V while a charging pulse is applied to the secondary battery, since the upper limit charging voltage is adjusted such that the upper limit charging voltage is lowered to the predicted charging voltage, when a voltage of the secondary battery is higher than the predicted charging voltage, the charging has been immediately cut off. Therefore, even when a charging current is applied to the secondary battery by the charging/discharging simulator, the charging of the secondary battery has not been performed.

Meanwhile, graphs (a) and (c) show that as the reference time increases, a reduction degree of the predicted charging current $I_Q^*$ and the predicted charging voltage V* is greater. This is because when the reference time increases, a predicted overheat amount is reduced even when the temperature of the secondary battery is the same.

According to the present disclosure, when the predicted charging voltage V* is low, the charging of the secondary battery is cut off at a lower voltage level. Therefore, since a charging amount of the secondary battery differs even when the secondary battery is charged/discharged under the same charging/discharging condition, and the secondary battery is not charged as much as a discharged amount, a state of charge of the secondary battery gradually converges to 0. Also, a state of charge of the secondary battery converges to 0 fast as the reference time is long. This is because when the reference time long, the cutting-off of the charging current occurs more frequently than a case where the reference time is short.

Also, as illustrated in FIG. 4, when the temperature of the secondary battery gradually increases, a predicted charging current $I_Q^*$ and a predicted charging voltage V* are reduced together. Therefore, since the charging of the secondary battery is cut off at a lower voltage level when the temperature of the secondary battery is high, an increase width in the temperature of the secondary battery is gradually reduced. Consequently, even when the charging/discharging experiment is performed until a state of charge z of the seconding battery becomes 0, the temperature of the secondary battery may maintain an appropriate level.

A temperature change when the charging/discharging of the secondary battery is in progress differs depending on an installation environment of the secondary battery. The present experiment results suggest it is preferable to set a small reference time in the case where the secondary battery is installed in an environment under which heat generated from the secondary battery is properly emitted to the outside. Also, the present experiment results suggest it is preferable to set a relatively long reference time so as to suppress heat generated while charging the secondary battery in the case where the secondary battery is installed in an environment under which heat generated from the secondary battery is not properly emitted to the outside.

Therefore, according to the present disclosure, the controller 160 may vary the reference time depending on a temperature increase speed of the secondary battery 110. That is, the controller 160 may increase the reference time in proportion to the temperature increase speed.

The present disclosure is particularly useful in the case where the present disclosure is applied to a no-cooled secondary battery which is not coupled to a cooling mechanism. However, it is obvious to a person of ordinary skill in the art that the present disclosure is applicable to any secondary battery regardless of whether a cooling mechanism is provided to a secondary battery.

In describing various embodiments of the present application, elements referred to as a 'unit' should be understood as functionally divided elements rather than physically divided elements. Therefore, each element may be selectively integrated with another element, or each element may be divided into sub-elements for efficient execution of control logic(s). However, when identity of function may be admitted even though elements are integrated or divided, it is obvious to a person of ordinary skill in the art that the integrated or divided elements should be construed as being within the scope of the present application.

Although the present application has been described through limited embodiments and drawings, the present application is not limited thereto and it is obvious that various changes and modifications may be made by those skilled in the art to which the present application pertains within the disclosure of the present application and equivalent scope of appended claims.

INDUSTRIAL APPLICABILITY

According to the present disclosure, the temperature of the secondary battery may be maintained at an appropriate level by varying a charging condition of the secondary battery with consideration of the temperature of the secondary battery. Particularly, even when a cooling mechanism is not coupled to the secondary battery, overheating of the secondary battery may be prevented. Also, the effective temperature control of the secondary battery may be made by changing a reference under which a charging condition varies depending on a heat transfer environment of the secondary battery.

What is claimed is:

1. An apparatus for adjusting a charging condition of a secondary battery, the apparatus comprising:
    a current measuring unit configured to measure a charging current of the secondary battery;
    a temperature measuring unit configured to measure a current temperature of the secondary battery; and
    a controller coupled to the current measuring unit and the temperature measuring unit,
    wherein the controller is configured to receive measurement results from the current measuring unit and the temperature measuring unit to determine a charging current value and a current temperature value, determine a predicted charging current capable of generating, as Joule's heat through an internal resistance of the secondary battery, a heat amount required to raise the temperature of the secondary battery from the current temperature to a threshold temperature for a preset reference time, determine a predicted charging voltage expected when the predicted charging current flows through an equivalent circuit of the secondary battery, and when a condition of the predicted charging voltage being lower than a preset upper limit charging voltage is satisfied, adjust the upper limit charging voltage such that the upper limit charging voltage is lowered to the predicted charging voltage.

2. The apparatus of claim 1, further comprising:
    a switch device provided to a path through which the charging current of the secondary battery flows; and
    a voltage measuring unit configured to measure a charging voltage of the secondary battery,
    wherein the controller is coupled to the switch device and the voltage measuring unit, and the controller receives measurement results of the voltage measuring unit to determine a charging voltage value of the secondary battery, and when the charging voltage value corresponds to the predicted charging voltage, cuts off the charging of the secondary battery by turning off the switch device.

3. The apparatus of claim 1, wherein the equivalent circuit comprises a serial resistor, at least one RC circuit, and an open circuit voltage source which varies a voltage thereof depending on a state of charge of the secondary battery, all of which are connected in series.

4. The apparatus of claim 3, wherein the controller calculates the predicted charging voltage from an equation below:

$$V=OCV(z)+i^*R0+V0^*\exp(-t/RC)+i^*R^*(1-\exp(-t/RC)).$$

where i is a current flowing through the equivalent circuit of the secondary battery, $R_0$ is a resistance value of the serial resistor, R is a resistance value of a resistor included in the RC circuit, C is a capacitance value of a condenser included in the RC circuit, $V_0$ is an initial voltage value generated from the RC circuit, z is a state of charge of the secondary battery, and OCV(z) is an open circuit voltage corresponding to the state of charge.

5. The apparatus of claim 4, further comprising a memory unit storing a state of charge-open circuit voltage lookup table, configured to lookup an open circuit voltage from a state of charge,
    wherein the controller determines the state of charge of the secondary battery by periodically measuring a charging current or a discharging current of the secondary battery via the current measuring unit and adding up the measured current values using a Coulomb counting method, and determines an open circuit voltage of the secondary battery by mapping the open circuit voltage corresponding to the determined state of charge from the state of charge-open circuit voltage lookup table.

6. The apparatus of claim 1, further comprising an external temperature measuring unit configured to measure an external temperature of the secondary battery,
    wherein the controller determines the external temperature value of the secondary battery by using the external temperature measuring unit, determines a predicted overheat amount Q* required to raise the temperature of the secondary battery from the current temperature to a preset threshold temperature for a preset time based on Equation below, calculates a current value capable of generating the predicted overheat amount Q* as Joule's heat via an internal resistance of the secondary battery, and determines the calculated current value as the predicted charging current:

$$Q^*=\{T^*-(T_c-T_{amb})\exp[-t^*/mC_pR_{th}]+T_{amb}\}/\{R_{th}(1-\exp[-t^*/mC_pR_{th}])\}$$

where T* is a preset threshold temperature, t* is a reference time, $T_c$ is a current temperature of the secondary battery measured by the temperature measuring unit, $T_{amb}$ is an external temperature of the secondary battery measured by the external temperature measuring unit, $R_{th}$ is a preset thermal resistance value between the secondary battery and outside, $C_p$ is a preset specific heat under constant pressure of the secondary battery, and m is weight of the secondary battery.

7. The apparatus of claim 1, further comprising an external temperature measuring unit configured to measure an external temperature of the secondary battery,
    wherein the controller determines the external temperature value of the secondary battery by using the external temperature measuring unit, and determines a current value corresponding to a solution approximately satisfying Equation below as the predicted charging current by applying a bisection algorithm to a current variable I of Equation below:

$$T^* = (T_c - T_{amb} - R_{th}I^2R)\exp\left(\frac{-t^*}{mC_pR_{th}}\right) + T_{amb} + R_{th}I^2R$$

where T* is a preset threshold temperature, t* is a reference time, $T_c$ is a current temperature of the secondary battery measured by the temperature measuring unit, $T_{amb}$ is an external temperature of the secondary battery measured by the external temperature measuring unit, $R_{th}$ is a preset thermal resistance value between the secondary battery and outside, $C_p$ is a preset specific heat under constant pressure of the secondary battery, m is weight of the secondary battery, and R is an internal resistance of the secondary battery.

8. The apparatus of claim 1, wherein the controller is configured to vary the reference time.

9. A method of adjusting a charging condition of a secondary battery, the method comprising:

(a) determining a charging current and a current temperature of the secondary battery;
(b) determining a predicted charging current capable of generating, as Joule's heat through an internal resistance of the secondary battery, a heat amount required to raise the temperature of the secondary battery from the current temperature to a threshold temperature for a preset reference time;
(c) determining a predicted charging voltage expected when the predicted charging current flows through an equivalent circuit of the secondary battery; and
(d) when a condition of the predicted charging voltage being lower than a preset upper limit charging voltage is satisfied, adjusting the upper limit charging voltage such that the upper limit charging voltage is lowered to the predicted charging voltage.

10. The method of claim 9, further comprising:
determining a charging voltage value of the secondary battery; and
when the charging voltage value corresponds to the predicted charging voltage, cutting off the charging of the secondary battery by turning off a switch device provided to a path through which the charging current flows.

11. The method of claim 9, wherein the equivalent circuit comprises a serial resistor, at least one RC circuit, and an open circuit voltage source which varies a voltage thereof depending on a state of charge of the secondary battery.

12. The method of claim 11, wherein the operation step (c) comprises calculating the predicted charging voltage from Equation below:

$$V=OCV(z)+i^*R_0+V_0^*\exp(-t/RC)+i^*R^*(1-\exp(-t/RC)).$$

(where i is a current flowing through the equivalent circuit of the secondary battery, $R_0$ is a resistance value of the serial resistor, R is a resistance value of a resistor included in the RC circuit, C is a capacitance value of a condenser included in the RC circuit, $V_0$ is an initial voltage value generated by the RC circuit, z is a state of charge of the secondary battery, and OCV(z) is an open circuit voltage corresponding to the state of charge).

13. The method of claim 9, further comprising measuring an external temperature value of the secondary battery,
wherein the operation step (c) comprises:
determining a predicted overheat amount Q* required to raise the temperature of the secondary battery from the current temperature to a preset threshold temperature for a preset time by using Equation below; and
calculating a current value capable of generating the predicted overheat amount Q* as Joule's heat via an internal resistance of the secondary battery, and determining the calculated current value as the predicted charging current:

$$Q^*=\{T^*-(T_c-T_{amb})\exp[-t^*/mC_pR_{th}]+T_{amb}\}/\{R_{th}(1-\exp[-t^*/mC_pR_{th}])\}$$

where T* is a preset threshold temperature, t* is a reference time, $T_c$ is a current temperature of the secondary battery measured by the temperature measuring unit, $T_{amb}$ is an external temperature of the secondary battery measured by the external temperature measuring unit, $R_{th}$ is a preset thermal resistance value between the secondary battery and outside, $C_p$ is a preset specific heat under constant pressure of the secondary battery, and m is weight of the secondary battery.

14. The method of claim 9, further comprising measuring an external temperature value of the secondary battery,
wherein the operation step (d) comprises:
determining a current value corresponding to a solution satisfying Equation below as the predicted charging current by applying a bisection algorithm to a current variable of Equation below:

$$T^* = (T_c - T_{amb} - R_{th}I^2R)\exp\left(\frac{-t^*}{mC_pR_{th}}\right) + T_{amb} + R_{th}I^2R$$

where T* is a preset threshold temperature, t* is a reference time, $T_c$ is a current temperature of the secondary battery measured by the temperature measuring unit, $T_{amb}$ is an external temperature of the secondary battery measured by the external temperature measuring unit, $R_{th}$ is a preset thermal resistance value between the secondary battery and outside, $C_p$ is a preset specific heat under constant pressure of the secondary battery, m is weight of the secondary battery, and R is an internal resistance of the secondary battery.

15. The method of claim 9, further comprising varying the reference time.

* * * * *